United States Patent
Johnson et al.

(10) Patent No.: US 10,580,116 B2
(45) Date of Patent: Mar. 3, 2020

(54) METHODS AND SYSTEMS FOR SPATIALLY LOCALIZED IMAGE EDITING

(71) Applicant: Apple Inc., Cupertino, CA (US)

(72) Inventors: Garrett M. Johnson, San Francisco, CA (US); David Hayward, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/158,185

(22) Filed: Oct. 11, 2018

(65) Prior Publication Data

US 2019/0043165 A1 Feb. 7, 2019

Related U.S. Application Data (63) Continuation of application No. 15/275,205, filed on Sep. 23, 2016, now Pat. No. 10,147,166.

(51) Int. Cl.
*G06T 3/40* (2006.01)
*G06T 5/00* (2006.01)
*G06T 5/40* (2006.01)

(52) U.S. Cl.
CPC .............. *G06T 3/403* (2013.01); *G06T 5/008* (2013.01); *G06T 5/40* (2013.01); *G06T 2207/10004* (2013.01); *G06T 2207/20021* (2013.01); *G06T 2207/20092* (2013.01); *G06T 2207/20192* (2013.01)

(58) Field of Classification Search
None
See application file for complete search history.

(56) References Cited

U.S. PATENT DOCUMENTS

| 8,958,658 B1 | 2/2015 | Lim et al. |
| 2014/0152686 A1 | 6/2014 | Narasimha et al. |

OTHER PUBLICATIONS

Unger et al., "A comparative review of tone-mapping algorithms for high dynamic range video," Eurographics, May 23, 2017.

*Primary Examiner* — Nicholas R Wilson
(74) *Attorney, Agent, or Firm* — Invoke (57) ABSTRACT

This invention provides methods for spatially localized image editing. For example, an input image is divided into multiple bins in each dimension. For each bin, a histogram is computed, along with local image statistics such as mean, medium and cumulative histogram. Next, for each tile, a type of adjustment is determined and applied, including adjustment associated with Exposure, Brightness, Shadows, Highlights, Contrast, and Blackpoint. The adjustments are done for all tiles in the input image to render a small adjustment image. The small image is then interpolated, for example, using an edge-preserving interpolation, to get a full size adjustment image with adjustment curve for each pixel. Subsequently, per-pixel image adjustments can be performed across an entire input image to render a final adjusted image.

20 Claims, 5 Drawing Sheets

METHODS AND SYSTEMS FOR SPATIALLY LOCALIZED IMAGE EDITING

INCORPORATION BY REFERENCE: DISCLAIMER

The following application is hereby incorporated by reference: application Ser. No. 15/275,205 filed on Sep. 23, 2016. The Applicant hereby rescinds any disclaimer of claim scope in the parent application or the prosecution history thereof and advises the USPTO that the claims in this application may be broader than any claim in the parent application.

TECHNICAL FIELD

The disclosure generally relates to digital image editing.

BACKGROUND

When editing images, there are two "generic" types of editing adjustments. Global adjustments, such as tone curves, levels, and saturation apply universally to the entire image. Local adjustments are typically thought of to be "brushing" type adjustments where the user manually "brushes" in adjustments to specific areas of the image that they are interested in. Global adjustments ignore differences between different local areas of an image and often result in an adjustment image that is either too dark in certain areas or too bright in certain areas.

Brush-type local adjustment often creates disconnection between brushed area and its surrounding areas. Global adjustment is more efficient but often leads to over exposure and under exposure. Global adjustment can also create areas that are too saturated (e.g., in skin tones) or not saturated enough (e.g., in colorful flowers or skies). In addition, applying brush-type local adjustment is manual, time consuming and tedious.

What is needed in the art are methods and systems that can balance the two type of approaches to create efficient and yet localized image editing.

SUMMARY

In one aspect, disclosed herein are methods and systems for spatially localized image editing. In some embodiments, the method comprise the steps of rendering a downsampled adjustment image of an input image by determining an adjustment curve for each tile in a plurality of tiles of the input image, where each adjustment curve defines a relationship of image editing controls that is applied to pixels in the tile, where the relationship is derived from one or more image characteristics of each tile in the plurality of tiles, the downsampled adjustment image having a plurality of pixels, and where each pixel corresponds to the adjustment curve for a tile in the plurality of tiles; upsampling the adjustment image, by applying an edge preserving upsampling algorithm, to a full size adjustment image that is the same size as the input image; where each pixel in the full size adjustment image corresponds to a new adjustment curve; and performing pixel by pixel adjustment of each pixel in the input image based on the new adjustment curve of a corresponding pixel in the full size adjustment image, thereby obtaining an edited version of the input image.

In one aspect, disclosed herein is an image upsampling process based on two different guide images.

In one aspect, disclosed herein is a non-transitory machine readable medium storing an image-editing application executable by at least one processor. Here, the image-editing application comprising sets of instructions for: dividing an input image into a plurality of tiles, where each tile comprises 10 or more pixels in either dimension; rendering a downsampled adjustment image by determining an adjustment curve for each tile in the plurality of tiles, where each adjustment curve defines a relationship of image editing controls that is applied to pixels in the tile, where the relationship is derived from one or more image characteristics of each tile in the plurality of tiles, the downsampled adjustment image having a plurality of pixels, and where each pixel corresponds to the adjustment curve for a tile in the plurality of tiles; upsampling the adjustment image, by applying an edge preserving upsampling algorithm, to a full size adjustment image that is the same size as the input image, where each pixel in the full size adjustment image corresponds to a new adjustment curve; and performing pixel by pixel adjustment of each pixel in the input image based on the new adjustment curve of a corresponding pixel in the full size adjustment image.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Figure 1:
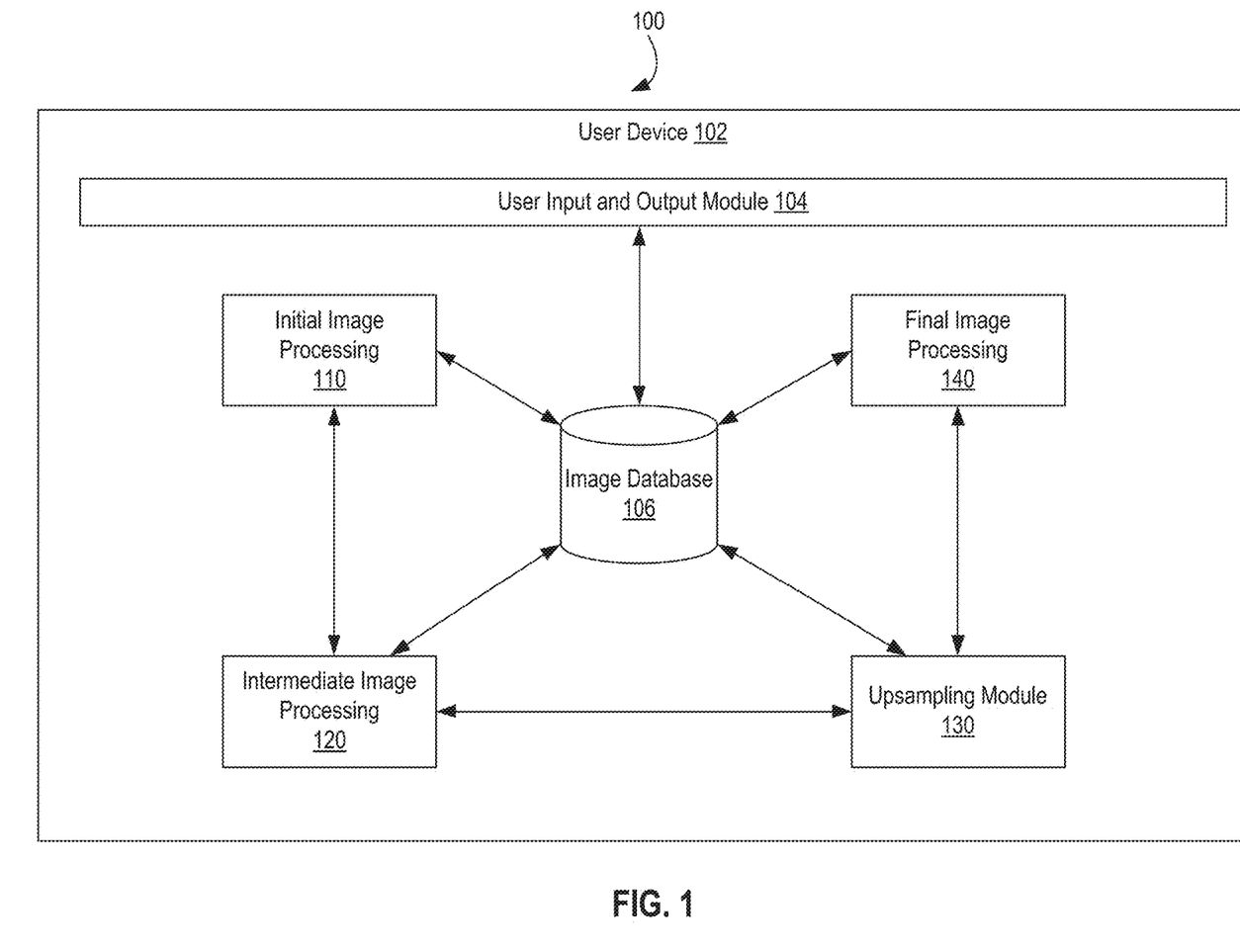
FIG. 1 is a block diagram of an example system for performing spatially localized editing of digital images.

FIG. 1 is a block diagram of an example system 100 for performing spatially localized image editing. For example, system 100 can perform spatially localized adjustments to a digital image by dividing an input image into multiple bins, characterizing pixels in the individual bins to determine one or more adjustment curves specific for each bin, and creating a downsampled adjustment image based on the bin-specific adjustment curves. The downsampled adjustment image is then upsampled to create new pixel-specific adjustment curves based on the bin-specific adjustment curve. In some embodiments, system 100 utilizes a number of functional modules to achieve the various functionalities, including initial image processing module 110, intermediate image processing module 120, upsampling module 130 and final image processing module 140.

Unless otherwise specified, images disclosed herein refer to digital images. Also, unless otherwise specified, the terms "image processing module," "processing module," and "image module" can be used interchangeably.

In some embodiments, system 100 can include user device 102. For example, user device 102 can be a computing device such as a smartphone, a tablet computer, a laptop computer, or a wearable device (e.g., smart watch, smart glasses, etc.).

In some embodiments, user device 102 includes a user input and output module (I/O module) 104. For example, I/O module 104 can receive user input to user device 102 and present output from user device 102 using audio, video, and/or haptic output mechanisms. For example, I/O module 104 can receive touch input from a touch sensitive display of user device 102. In other embodiments, the user input and output module can be coupled to other input devices, such as a keyboard, mouse, touch sensitive pad, etc., and receive user input from these devices.

In some embodiments, I/O module 104 can present audio, visual, and/or haptic output to the user. For example, I/O module 104 can render graphical user interfaces (GUI) for performing spatially localized image editing, as described herein. I/O module 104 can present GUIs that enable or support the functionality of one or more of the image processing modules described herein, including but not limited to initial image processing module 110, intermediate image processing module 120, upsampling module 130 and final image processing module 140. In some embodiments, the user input and output module includes a plurality of menu commands, each corresponding to the functionality of one or more of the image processing modules. In some embodiments, I/O module 104 can allow a user to enter voice commands for performing spatially localized image editing, as described herein. Additionally, for example, I/O module 104 can allow a user to enter commands by tapping a touch screen.

In some embodiments, user device 102 can include image database 106. For example, image data base 106 includes images that are taken and saved on user device 102. In some embodiments, a user can store images at various stages of processing in image database 106. The functionality is achieved by connecting different processing modules (e.g., modules 110, 120, 130 and 140) to a centralized image database.

In some embodiments, user device 102 can include initial image processing module 110. For example, a user can select (e.g., via user input and output module 104) an image (e.g., input image 210 in FIG. 2) stored in image database 106 for editing. In some implementations, initial image processing module 110 can divide input image 210 into a plurality of tiles, grids, or bins. As disclosed herein, the terms "bin," "grid" and "tile" are used interchangeably.

In some embodiments, a user can choose from pre-defined settings; e.g., from a pull-down or pop-up menu to select a specific bin setting among multiple settings predefined based on commonly available sizes of digital images. For example, an input image of 680 pixel×850 pixel can be divided into a 34×34 grid map, where each grid includes an array of 20 pixel×25 pixel (a total of 500 pixels). Alternatively, the same input image can be divided into a 20×25 grid map, where each grid include an array of 34 pixel×34 pixel (a total of 1156 pixels). It will be understood that the size of the grid map (and the number of bins) can be determined based on the size of an input image.

Figure 2:
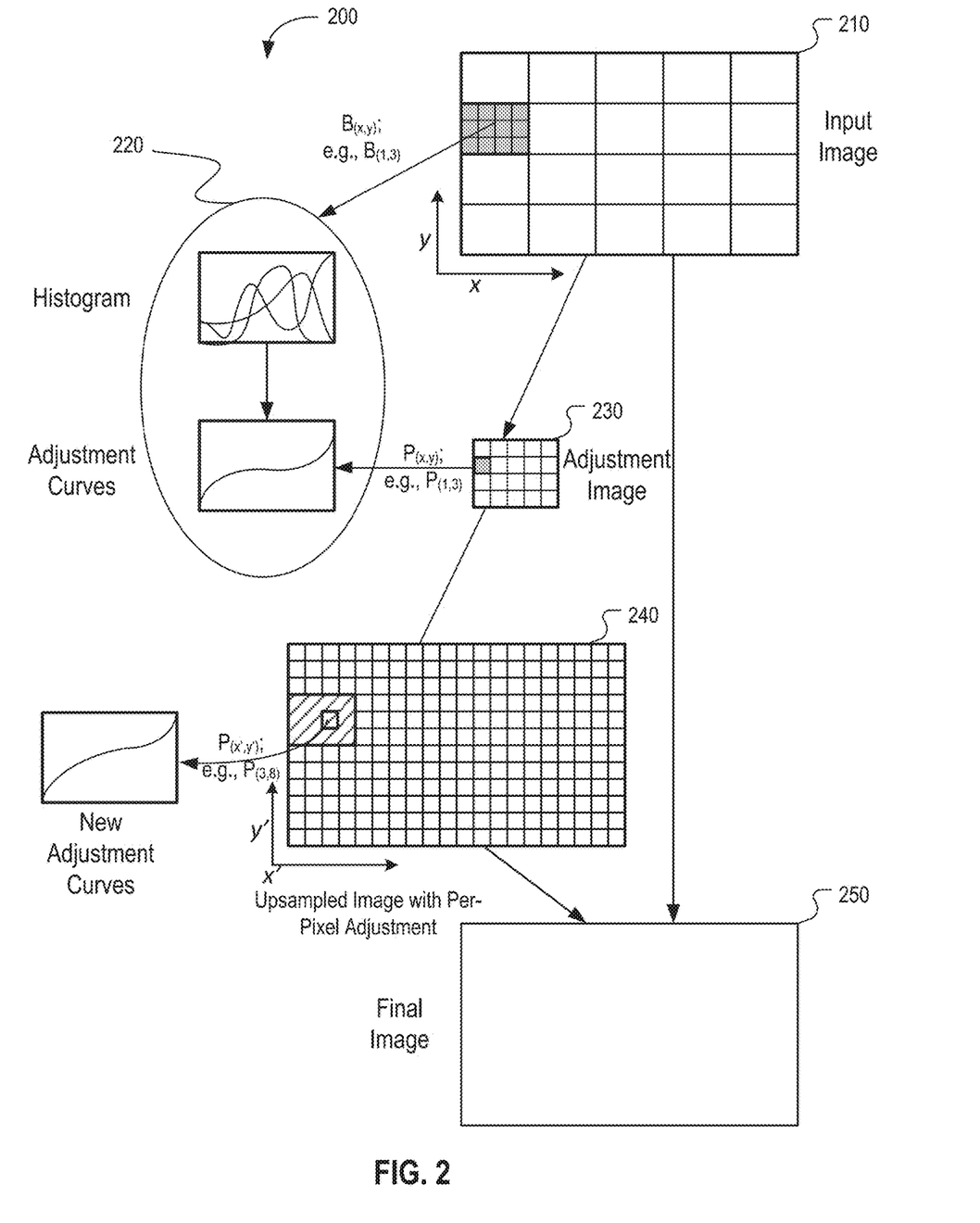
FIG. 2 is an illustration of an example process of the spatially localized image processing method.

Initial image processing module 110 characterizes image data from input image 210 at individual bin level. For example, each bin includes a number of pixels (e.g., m×n pixels) and these pixels are further analyzed by initial image module 110. For example, the user may wish to edit an image to change exposure level of selected areas of input image 210. Using spatially localized editing, a user can adjust the exposure level of each bin individually, avoiding over-exposure or under-exposure that is often associated with a global adjustment operation. Initial image processing module 110 can identify exposure level of all pixels in each bin and compiles a profile (e.g., a histogram). An image histogram is a type of histogram that acts as a graphical representation of the tonal or color distribution in a digital image.

In some embodiments, initial image processing module 110 can also compile data concerning additional characteristics such as color distribution for all color channels; e.g., red green and blue (RGB) channels or cyan magenta yellow and black (CMYK) channels. In some embodiments, initial image processing module 110 can covert input image 210 into a grey image to calculate a grey scale histogram. After histograms are generated for each bin, initial image processing module 110 can further analyze the histograms to derive a bin-specific adjustment curve. The bin-specific adjustment curve defines the relationships for editing all pixels in the particular bin. Additional details concerning adjustment curves can be found in description of FIG. 2. As disclosed herein, the terms "adjustment curve," "adjustment function," "adjustment algorithm," and "adjustment relationship" can be used interchangeably unless otherwise specified.

In some embodiments, the user can choose to save data from initial image processing module 110 in image data base 106. Alternatively, the user can send the initially processed images to intermediate image processing module 120 for further processing. For example, a user can select one or more commands (e.g., "save image data" and "continue to process image") through via I/O module 104 to execute one or both options.

In some embodiments, user device 102 can include intermediate image processing module 120. Intermediate image processing module 120 organizes adjustment curves of each individual bin to generate a downsampled image (e.g., adjustment image 230). For example, module 120 can render adjustment image 230 based on input image 210. Each "pixel" in the downsampled image is associated with one or more adjustment curves of a corresponding bin in original input image 210. For example, bin $B_{(x,y)}$ in input image 210 corresponds to pixel $P_{(x,y)}$ in adjustment image 230, In the adjustment image 230, each pixel is associated with a corresponding adjustment curve. In some embodiments, intermediate image processing module 120 creates an adjustment image 230 for each of exposure, brightness, shadows, highlights, contrast, and blackpoint. In some embodiments, adjustment image 230 corresponds to two or more of the image characteristics in any possible combination. As disclosed herein, the terms downsampled adjustment image and "downsampled image" are be used interchangeably unless otherwise specified.

In some embodiments, a user can choose to save the adjusted (and downsampled) images in image database 106. Alternatively, a user can choose to continue to process the downsampled images using upsampling module 130. For example, a user can select one or more commands (e.g., "save image data" and "continue to process image") through user input and output module 104 to execute one or both options. In some embodiments, the functionalities of the initial image module 110 and intermediate image processing module 120 are combined in one image module.

In some embodiments, user device 102 can include upsampling module 130. In some embodiments, upsampling module 130 can generate an upsampled image based on the adjusted and downsampled images (e.g., adjustment image 230 in FIG. 2). For example, upsampling module 130 can receive downsampled images from intermediate module 120, or database 106, and generate upsampled image 240 based on the downsampled images. For example, module 130 can generate the upsampled image using an upsampling algorithm, such as nearest-neighbor interpolation, bilinear interpolation, bicubic interpolation, Lanczos resampling, Fourier-based interpolation, edge-directed interpolation algorithms, and etc. Preferably, edge-directed interpolation algorithms are used because these algorithms aim to preserve edges in the image after scaling, unlike other algorithms which can produce staircase artifacts around diagonal lines or curves. Examples of edge preserving algorithms include but are not limited to New Edge-Directed Interpolation (NEDI), Edge-Guided Image Interpolation (EGGI), Iterative Curvature-Based Interpolation (ICBI), and Directional Cubic Convolution Interpolation (DCCI).

In some embodiments, a fast edge preserving upsampling algorithm is applied during the upsampling process. Additional details concerning the method can be found in application Ser. No. 15/633,632, entitled "FAST AND EDGE-PRESERVING UPSAMPLING OF IMAGES" which claims priority to provisional Application No. 62/399,318 filed concurrently herewith. Application Ser. No. 15/633,632 is hereby incorporated by reference in its entirety.

During upsampling, one bin-specific adjustment curve is converted to multiple pixel-specific adjustment curves; e.g., m×n pixel-specific adjustment curves, depending on the number of pixels included in the particular bin. Details of the conversion from one bin-specific adjustment curve to multiple pixel-specific adjustment curves can be found in the description of upsampled image 240 of FIG. 2 and the description of steps 308 and 310 of FIG. 3.

In some embodiments, the upsampled image is of the same size as the input image. In some embodiments, the upsampled image is of a different size from the input image.

In some embodiments, a user can save the upsampled images in image database 106. Alternatively, the user can choose to further process the upsampled images using final image processing module 140. For example, a user can select one or more commands (e.g., "save image data" and "continue to process image") through user I/O module 104 to execute one or both options.

Functionalities of different modules can be performed separately by individual modules. Multiple functionalities can also be performed in one functional module. In some embodiments, the functionalities of initial image module 110 and intermediate image processing module 120 are combined in one image module. In some embodiments, the functionalities of initial image module 110, intermediate image processing module 120, and upsampling module 130 are combined in one image module. In some embodiments, the functionalities of initial image module 110, intermediate image processing module 120, upsampling module 130 and final image processing module 140 are combined in one image module.

FIG. 2 is an illustration 200 of an example process of a spatially localized image processing method. As shown in illustration 200, input image 210 is first downsampled to adjustment image 230 and then upsampled to upsampled image 240. Information from upsampled 240 are combined with input image 210 to render a final image 250.

As an initial step, input image 210 is subdivided into a plurality of bins; e.g., by initial image processing module 110. As illustrated in FIG. 2, input image of 12×20 is divided into a 4×5 grid map. Each bin in the grid map can be labeled as $B_{(x,y)}$, where x and y are two dimensional axes used to specify the location of the particular bin. Here, the value for x is an integer from 1 to 5 and the value for y is an integer from 1 to 4. For example, the highlighted grid in input image 210 can be designated as is $B_{(1,3)}$. In the simple illustration, the grid includes 12 pixels arranged in a 3 pixel×4 pixel array.

In some embodiments, initial image processing module 110 can analyze digital image characteristics of each grid to compile image histograms. A histogram is a bar graph. In a tone histogram, the x-axis represents the tonal scale (black at the left and white at the right), and y-axis represents the number of pixels in an image in a certain area of the tonal scale. For example, the graph of a luminance histogram shows the number of pixels for each brightness level (from black to white), and when there are more pixels of a particular brightness level, the peak at the certain luminance level is higher.

A color histogram is a representation of the distribution of colors in an image. For digital images, a color histogram represents the number of pixels that have colors in each of a fixed list of color ranges, that span the image's color space, the set of all possible colors. In some embodiments, color histograms can be established for color distribution for all color channels; e.g., red green and blue (RGB) channels or cyan magenta yellow and black (CMYK) channels. For example, a red histogram can show how the intensity of the color red is distributed throughout the bin. In some embodiments, initial image processing module 110 can covert input image 210 into a grey image to calculate a grey scale histogram. For example, it is possible to calculate a saturation histogram to determine how much saturation/desaturation to be applied to a particular bin. In some embodiments, the level of saturation/desaturation can be applied to multiple bins. In some embodiments, it is possible to examine the standard deviation of the bin to determine how much sharpening to be applied to the bin. In some embodiments, the level of sharpening can be applied to multiple bins.

After histograms are generated for each bin, initial image processing module 110 can further analyze the histograms to derive a bin-specific adjustment curve. The bin-specific adjustment curve defines relationships for editing the pixels in the particular bin. In some embodiments, the adjustment curve is a cumulative histogram curve. For example, a cumulative histogram is a mapping that counts the cumulative number of observations (such as brightness level) in all of the pixels in a particular bin. Cumulative histogram can be used to identify areas within an image that is over-exposed or under-exposed. In some embodiment, initial image processing module 110 can apply a simple linear function to tone down a bin with over-exposed pixels or enhance a bin with under-exposed pixels. In some embodiments, the adjustment curve is a standard tone curve. For example, if a user wants to adjust the exposure level of pixels in the particular bin, an exposure adjustment curve can be automatically calculated; e.g., based on a medium exposure level of each bin. Additionally, a user can input a desired exposure level via I/O module 104 and initial image processing module 110 can generate an adjustment curve based on the input value. As disclosed herein, initial image processing module 110 defines a bin-specific adjustment curve for each bin. As such, in the example illustrated in FIG. 2, twenty bin-specific adjustment curves will be defined for input image 210.

Immediate image processing module 120 then applies each of the twenty bin-specific adjustment curves to a corresponding bin such that pixels within the particular bin are adjusted. After the adjustment, adjustment image 230 can be created as an adjusted and downsampled version of input image 210. For example, after the 12 pixels in bin $B_{(1,3)}$ are adjusted, the adjusted pixels can be downsampled to one pixel; for example, the immediate image processing modules can take the intensity values for each color channel from 12 pixels and calculate a color average for each channel. As such, in some embodiments, 12 pixels in $B_{(1,3)}$ of input image 210 is converted to pixel $P_{(1,3)}$ in adjustment image 230. Immediate image processing module 120 organizes local adjustment for each bin in input image 210 to convert input image 210, which is 12 pixel×20 pixel, to adjustment image 230, which is 4 pixel×5 pixel. Additionally, any known algorithm for downsampling can be used for creating adjustment image 230. Example algorithms include but are not limited to nearest-neighbor interpolation, bilinear interpolation, bicubic interpolation, Lanczos resampling, Fourier-based interpolation, edge-directed interpolation algorithms, and etc. Preferably, edge-directed interpolation algorithms are used because these algorithms aim to preserve edges in the image after scaling, unlike other algorithms which can produce staircase artifacts around diagonal lines or curves. Example edge preserving algorithms include but are not limited to New Edge-Directed Interpolation (NEDI), Edge-Guided Image Interpolation (EGGI), Iterative Curvature-Based Interpolation (ICBI), and Directional Cubic Convolution Interpolation (DCCT).

In some embodiments, a user can choose to save adjustment image 230 in image databased 106. Alternatively, a user can choose to continue processing adjustment image 230 at upsampling module 130. For example, a user can select one or more commands (e.g., "save image data" and "continue to process image") through user I/O module 104 to execute one or both options.

Next, upsampling module 130 takes adjustment image 230 as input and applies an upsampling algorithm to create upsampled image 240. Preferably, the upsampling algorithm includes edge-directed interpolation algorithms to preserve edges in the image after scaling, unlike other algorithms which can produce staircase artifacts around diagonal lines or curves. Example edge preserving algorithms include but are not limited to New Edge-Directed Interpolation (NEDI), Edge-Guided Image Interpolation (EGGI), Iterative Curvature-Based Interpolation (ICBI), and Directional Cubic Convolution Interpolation (DCCI).

In some embodiments, upsampling module 130 applies a fast edge preserving upsampling algorithm during the upsampling process. Additional details concerning the method can be found in application Ser. No. 15/633,632, entitled "FAST AND EDGE-PRESERVING UPSAMPLING OF IMAGES" which claims priority to provisional Application No. 62/399,318 filed concurrently herewith. Application Ser. No. 15/633,632 is hereby incorporated by reference in its entirety.

After upsampling, adjustment image 230 (a 5×4 grid map) is turned into upsampled image 240 (a 20×16 grid map). In upsampled image 240, x' and y' are the two dimensional axes that can be used to specify the location of pixels within the image. Here, the value for x' is an integer from 1 to 20 and the value for y' is an integer from 1 to 16. As such, pixel $P_{(1,3)}$ in adjustment image 230 itself is transformed back to an array of 3 pixel×4 pixel, as indicated by the patterned area in upsampled image 240:

{$P_{(1,7)}$, $P_{(2,7)}$, $P_{(3,7)}$, $P_{(4,7)}$};
{$P_{(1,8)}$, $P_{(2,8)}$, $P_{(3,8)}$, $P_{(4,8)}$}; and
{$P_{(1,9)}$, $P_{(2,9)}$, $P_{(3,9)}$, $P_{(4,9)}$}.

As noted above, pixel $P_{(1,3)}$ is associated with an adjustment curve. Based on the values of the pixels in the upsampled array, upsampling module 130 can calculate a new pixel-specific adjustment curve for each pixel: each pixel in the pixel array is associated with its own adjustment function.

In preferred embodiments, upsampled image 240 is of the same size as input image 210. In some embodiments, upsampled image 240 may be larger or smaller than input image 210.

In some embodiments, a user can choose to save upsampled image 240 in image databased 106. Alternatively, a user can choose to continue processing upsampled image 240 at final image processing module 140. For example, a user can select one or more commands (e.g., "save image data" and "continue to process image") through user UO module 104 to execute one or both options.

Final image processing module 140 applies a pixel-specific adjustment curve from a pixel in upsampled image 240 to the corresponding pixel in input image 210. For example, final image processing module 140 applies the new pixel-specific adjustment curve of pixel $P_{(3,8)}$ in upsampled image 240 to pixel $P_{(3,8)}$ in input image 210. Final image processing module 140 applies pixel-by-pixel adjustment to each pixel in input image 210 to render final image 250. As disclosed herein, the terms "final image," "final adjusted image," and "result image" are used interchangeably unless otherwise specified.

In some embodiments, each of the types of images (e.g., input image 210, adjustment image, upsampled image 240 and final image 250) is handled by a dedicated functional modules (e.g., initial image processing module 110, intermediate image processing module 120, upsampling module 130 and final image processing module 140). In some embodiments, the functionalities of initial image module 110 and intermediate image processing module 120 are combined in one image module. In some embodiments, the functionalities of initial image module 110, intermediate image processing module 120, and upsampling module 130 are combined in one image module. In some embodiments, the functionalities of initial image module 110, intermediate image processing module 120, upsampling module 130 and final image processing module 140 are combined in one image module.

Example Processes

Figure 3:
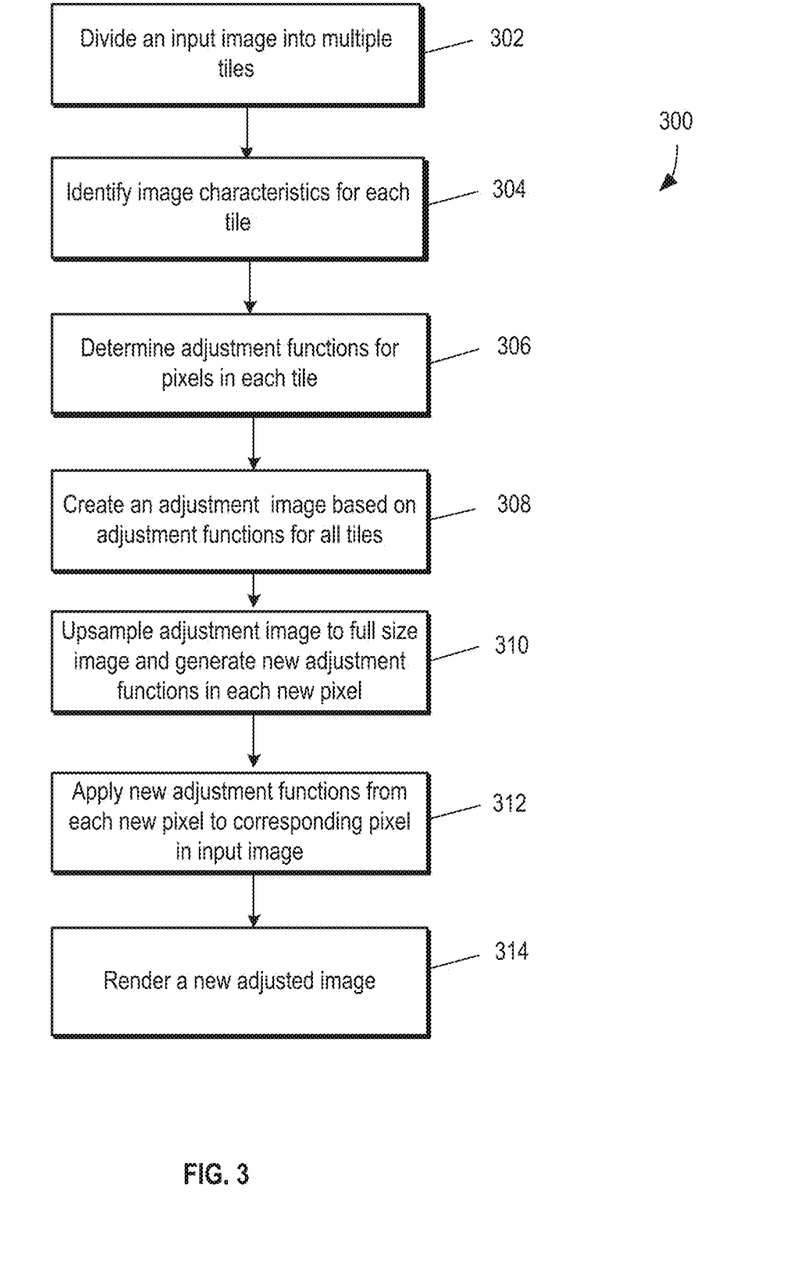
FIG. 3 is flow diagram of an example process of the spatially localized image processing method.

FIG. 3 is flow diagram of an example process 300 of spatially localized image processing method. For example process 300 can be performed by user device 102 to adjust or edit characteristics of an image. The flow diagram illustrates how an input image is divided into multiple bins and downsampled to an adjustment image corresponding to bin-specific local adjustment. The adjustment image is then upsampled to an upsampled image to create pixel-specific adjustment functions, which are then applied, pixel-by-pixel, to the input image to create a final adjusted image.

At step 302, user device 102 can divide an input image into multiple bins or tiles. In some embodiments, the input image is divided into a m×n grid, wherein m and n are integers that are equal or greater than 5. In some embodiments, the number of grids corresponds to the number of pixels. For example, in can include 10 or more, 50 or more, or 500 or more pixels. Similarly, n can include 10 or more, 50 or smaller, or 500 or more pixels. In some embodiments, m and n have the same value. In some embodiments, in and n have different values. As rioted above, the size of a grid map can be determined based on the dimensions of commonly available digital image format. For example, an image 1024 pixel×768 pixel can be divided into a 32×32 grid map (m=32 and n=24), while a 800 pixel×600 pixel image can be divided into a 20×20 grid map (m=40 and n=30). In some embodiments, an image of 2028×1536 can divided in a 32×24 grid map (m=64 and m=64).

At step 304, mage characteristics of the pixels within each bin are determined; e.g., by using initial image processing module 110. Image characteristics are associated with image features such as color, tone, exposure, contrast, shadows, brightness, blackpoint and etc. Sample image characteristics include but are not limited to a color histogram, a grey histogram, a cumulative histogram, statistics, or a user input.

In a tone histogram, the x-axis represents the tonal scale (black at the left and white at the right), and y-axis represents the number of pixels in an image in a certain area of the tonal scale. For example, the graph of a luminance histogram shows the number of pixels for each brightness level (from black to white), and when there are more pixels of a particular brightness level, the peak at the certain luminance level is higher.

A color histogram is a representation of the distribution of colors in an image. For digital images, a color histogram represents the number of pixels that have colors in each of a fixed list of color ranges, that span the image's color space, the set of all possible colors. In some embodiments, color histograms can be established for color distribution for all color channels; e.g., red green and blue (RGB) channels or cyan magenta yellow and black (CMYK) channels. For example, a red histogram can show how the intensity of the color red is distributed throughout the bin. In some embodiments, initial image processing module 110 can covert input image 210 into a grey image to calculate a grey scale histogram.

After histograms are generated for each bin, initial image processing module 110 can further analyze the histograms to derive a bin-specific adjustment curve. The bin-specific adjustment curve defines relationships for editing the pixels in the particular bin. In some embodiments, the bin-specific adjustment curve is a cumulative histogram curve. For example, a cumulative histogram is a mapping that counts the cumulative number of observations (such as brightness level) in all of the pixels in a particular bin. Cumulative histogram can be used to identify areas within an image that is over-exposed or under-exposed. In some embodiments, a plurality of histograms are calculated for each bin. In some embodiments, a cumulative histogram is calculated for each bin. In some embodiments, colored images are analyzed. In some embodiments, colored images are converted to grey scale before characterization.

At step 306, intermediate image processing module 120 determines the relationships of image editing controls for pixels in each bin. For example, after histograms are generated for each bin, initial image processing module 110 can further analyze the histograms to derive a bin-specific adjustment curve. The bin-specific adjustment curve defines relationships for editing the pixels in the particular bin. In some embodiments, the adjustment curve is a cumulative histogram curve. For example, a cumulative histogram is a mapping that counts the cumulative number of observations (such as brightness level) in all of the pixels in a particular bin. In some embodiment, intermediate image processing module 120 can apply a simple linear function to tone down a bin with over-exposed pixels or enhance a bin with under-exposed pixels. In some embodiments, the bin-specific adjustment curve is a standard tone curve. For example, if a user wants to adjust the exposure level of pixels in the particular bin, an exposure adjustment curve can be automatically calculated; e.g., based on a medium exposure level of each bin. Additionally, a user can input a desired exposure level via I/O module 104 and intermediate image processing module 120 can generate an adjustment curve based on the input value. As disclosed herein, initial image processing module 110 defines a bin-specific adjustment curve for each bin. As such, in the example illustrated in FIG. 2, twenty bin-specific adjustment curves will be defined for input image 210.

In some embodiments, relationships between image editing controls are defined in one or more bin-specific adjustment curves. In some embodiments, an image editing control is defined based on one or more image characteristics. Example image editing controls include but are not limited to exposure controls, brightness controls, shadows controls, highlights controls, contrast controls, blackpoint controls. In some embodiments, a bin-specific adjustment curve defines the relationship for one image characteristic. For example, as noted above, a simple linear function may be used to tone down a bin with over-exposed pixels or enhance a bin with under-exposed pixel. In some embodiments, a bin-specific adjustment curve defines the relationship for two or more image characteristics. For example, exposure level, brightness level and contrast level are related to each and can be adjusted using the same bin-specific adjustment function.

In some embodiments, the bin-specific adjustment curve is a polynomial function; for example, a second order polynomial function;

$$y=ax^2+(1-a)x, \qquad (1)$$

where x represents an image characteristic prior to adjustment such as the intensity value of a color, y represents the adjusted value, and a is the adjustment value. The following example illustrates how adjustment value in a second order polynomial function is determined. Here, a bin in the original input image included a RGB color channels as well as brightness. As disclosed herein, a can be associated with one or more bin-specific adjustment curves. In some embodiments, a represents what is stored in downsampled adjustment image 230. In some embodiments, after upsampling, a is associated with one or more pixel-specific adjustment curves for pixels in the upsampled adjustment image. In some embodiments, a represents what is stored in upsampled adjustment image 240.

For the example second order polynomial function: $y=ax^2+(1-a)x$, luminance value (Y) can be used to compute the value of a:

$$\text{adjusted value}=a*Y_{(x,y)}*Y_{(x,y)}+(1-a)*Y_{(z,y)} \qquad (2)$$

Here, $Y_{(x,y)}$ is the luminance value for a pixel $P_{(x,y)}$. A series of equations can be obtained for all pixels in the bin. When the desired value is set as the median luminance value (e.g., 0.435), the equation series can be used to solve a such that half of the adjusted values are above the medium luminance value and half of the adjusted values are below the medium luminance value.

At step 308, intermediate processing module 120 can apply a bin-specific adjustment curve previously determined at step 306 to pixels in the selected bin. Intermediate processing module 120 applies image editing to each bin based on a corresponding bin-specific adjustment curve determined for the particular bin. In some embodiments, a standard tone curve is applied. In some embodiments, intermediate processing module 120 applies a bin-specific adjustment curve that modifies or optimizes one or more image characteristics. In some embodiment, intermediate processing module 120 applies a bin-specific adjustment curve that modifies or optimizes one or more image control. At this step, intermediate processing module 120 applies bin-specific adjustment to each bin instead of a global adjustment that is applied to the entire image. In particular, the same adjustment is applied to pixels within the same bin. Essentially; the bin-based image editing is a local adjustment: the total number of bin-specific adjustment curve corresponds to the number of bins. After the pixels of each bin is adjusted, a downsampled adjustment image is created where the number of pixels in the adjustment image corresponds to the number of adjustment curves that is used to edit the bins of the input image. Intermediate processing module 120 can apply any known algorithm for resizing an image (e.g., including downsizing and upsizing). Example algorithms include but are not limited to nearest-neighbor interpolation, bilinear interpolation, bicubic interpolation, Lanczos resampling, Fourier-based interpolation, edge-directed interpolation algorithms, and etc. Preferably, edge-directed interpolation algorithms are used because these algorithms aim to preserve edges in the image after scaling, unlike other algorithms which can produce staircase artifacts around diagonal lines or curves. Example edge preserving algorithms include but are not limited to New Edge-Directed interpolation (NEDI), Edge-Guided Image Interpolation (EGGI), iterative Curvature-Based Interpolation (ICBI), and Directional Cubic Convolution Interpolation (DCCI).

Once the a value is determined, the same equation can be used to calculate color values of each pixel in the bin, based on the following equations:

$$\text{newRed}=a*\text{origRed}*\text{origRed}+(1-a)*\text{origRed} \quad (3)$$

$$\text{newGreen}=a*\text{origGreen}*\text{origGreen}+(1-a)*\text{origGreen} \quad (4)$$

$$\text{newBlue}=a*\text{origBlue}*\text{origBlue}+(1-a)*\text{origBlue} \quad (5)$$

A user-controlled slider then could be used to adjust how close towards "a" the adjustment goes based on the following $$a=(\text{sliderValue})*a \quad (6)$$

So when the slider is at 0, nothing happens (the above equations (3)-(5) solve to origRed, origGreen, origBlue), and when the slider is at 1, full "corrections" are obtained so that each area would have the same average luminance.

In some embodiments, intermediate image processing module 120 applies one or more image adjustment algorithms at step 306.

In a simple example, as illustrated in connection with FIG. 2, intermediate processing module 120 can calculate an average for the adjusted pixels in a particular bin.

At step 310, upsampling module 130 upsamples the downsampled adjustment image to create a full size upsampled image. In some embodiments, an edge preserving upsampling algorithm (such as one of those disclosed above) is applied during the upsampling process. After upsampling, a pixel-specific new adjustment curve is created for each pixel in the upsampled image, as illustrated in FIG. 2. For example, after upsampling, pixel $P_{(1,3)}$ in adjustment image 230 is expanded to an array of 3 pixel×4 pixel, as indicated by the patterned area in upsampled image 240:

{$P_{(1,7)}$, $P_{(2,7)}$, $P_{(3,7)}$, $P_{(4,7)}$};
{$P_{(1,8)}$, $P_{(2,8)}$, $P_{(3,8)}$, $P_{(4,8)}$}; and
{$P_{(1,9)}$, $P_{(2,9)}$, $P_{(3,9)}$, $P_{(4,9)}$}.

Based on the adjusted values of pixels in the expanded pixel array, upsampling module 130 can calculate new pixel-specific adjustment curves based on the original bin-specific adjustment curve. For example, in comparison to the pixel $P_{(1,3)}$ in adjustment image 230, a color intensity of upsampled pixel $P_{(3,8)}$ in upsampled image 240 may have been slightly adjusted during upsampling. A new adjustment curve for pixel $P_{(3,8)}$ can be calculated based on the bin-specific adjustment curve and the differences between pixel $P_{(1,3)}$ in adjustment image 230 and pixel $P_{(3,8)}$ in upsampled image 240.

Similar to bin-specific adjustment curves, pixel-specific adjustment curves controls include but are not limited to exposure controls, brightness controls, shadows controls, highlights controls, contrast controls, blackpoint controls. In some embodiments, an adjustment curve defines the relationship of two, three, four, five, or six image editing controls.

Example adjustment curve includes but is not limited to a polynomial function, a linear function, a gamma function, an exponential function, a linear equation, a sigmoid function, and combinations thereof.

In some embodiments, the adjustment curve is a second order polynomial based tone curve: $y=ax^2+(1-a)x$, x represents an input data value such as the intensity of a particular color in a particular pixel, y represents an output result, and a is a value specific to all pixels in each tile, where x and y correspond to pixel values of one or more selected from the group consisting of exposure, brightness, shadows, highlights, contrast, blackpoint and combinations thereof.

A second order polynomial function is advantageous for a number of reasons. First, it is similar to common tone-curves and can both lighten (when a is less than 0) or darken (when a is greater than 0) in a pleasing manner. Second, a second order polynomial is also quick to compute on the GPU, when compared to other tone curves. And lastly, solving for a in a second order polynomial function is a simple closed-form set of linear equations.

Different functions can be used under different circumstances. For example, a "gamma" or exponential function can be used, however such a function may be too strong in lifting the shadows, causing images to look washed out. Additionally, in some embodiments, solving simple linear equations work well in the shadows, but may make the highlights gray and murky. A more complicated "sigmoid" function may be applicable as well, such as a hyperbolic-tangent or a cumulative normal; however, those are much more computationally expensive to apply.

In some embodiments, a simple linear gain is used for only adjusting "shadows." In some embodiments, a polynomial function is used to perfoi in six adjustments at once, including exposure, brightness, shadows, highlights, contrast, and hlackpoint.

In some embodiments, a slider can be used to adjust the values of one or more parameters.

At step 312, new pixel-specific adjustment curves obtained from the previous step is applied to input image 210 for pixel-by-pixel image editing. As discussed above in connection with step 310, each upsampled pixel is associated with a new pixel-specific adjustment curve. In preferred embodiments, full size upsampled image 240 is of the same size as input image 210 such that each pixel in the upsampled image has a corresponding pixel in input image 210. For example, the new adjustment curve for pixel $P_{(3,8)}$ in upsampled image 240 can be applied to corresponding pixel $P_{(3,8)}$ in input image 210 to generate a final edited pixel $P_{(3,8)}$.

At step 314, final image processing module 140 applies pixel-by-pixel editing to each pixel in input image 210 to generate final edited pixels corresponding to all pixels in input image 210. The result is final image 250.

Figure 4:
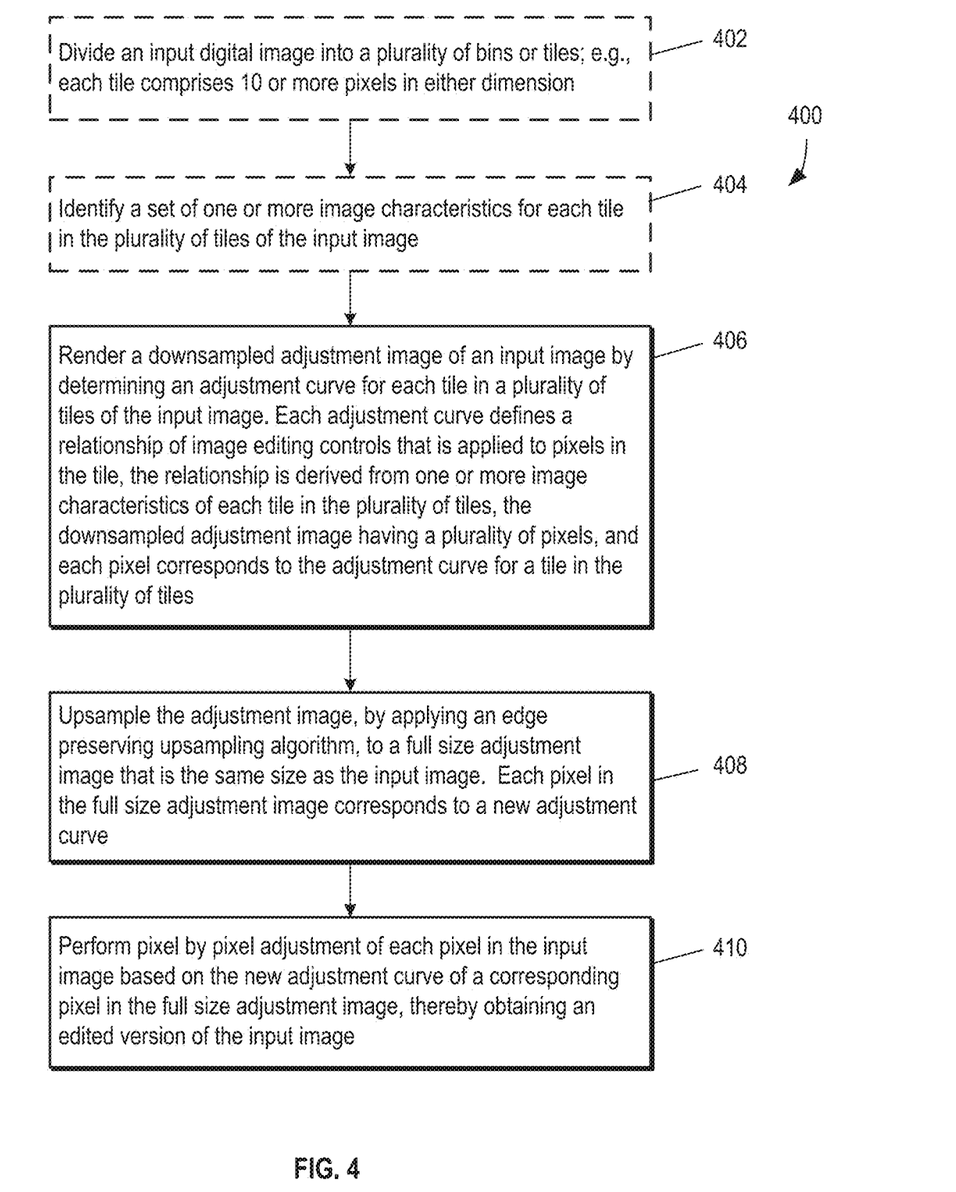
FIG. 4 is flow diagram of an example process of the spatially localized image processing method.

FIG. 4 illustrates an example image processing process 400, showing a preferred embodiment of spatially localized image editing method. For example, process 400 can be performed by user device 102, described above.

At step 402, an input digital image is divided into a plurality of bins or tiles. Each bin or tile is a two dimensional area that comprise multiple pixels in either dimension. For example, either dimension can include 10 or more, 50 or more, or 100 or more pixels.

At step 404, one or more image characteristics are detemiined for each bin of the input image, as discussed in connection with initial image processing module 110 in FIG. 1, step 220 in FIG. 2 and step 304 in FIG. 3.

At step 406, an adjustment curve is determined for each bin to create a downsampled adjustment image of the input image. The downsampled adjustment image comprises a plurality of pixels, each corresponding to one or more adjustment curves for a bin of the plurality of bins. Each adjustment curve defines a relationship of image editing controls that is applied to pixels in the tile. The relationship is derived from one or more image characteristics of each tile in the plurality of tiles. Additional details concerning step 406 can be found in the description of initial image processing module 110 and intermediate processing module in FIG. 1, the description of step 220 and adjustment image 230 in FIG. 2, and the description of steps 306 and 308 in FIG. 3.

At step 408, the downsampled adjustment image is upsampled to a full size adjustment image that is of the same size as the original input image. Here, an edge preserving upsampling algorithm is applied. Each pixel in the full size adjustment image has a corresponding new adjustment curve. Additional details concerning step 408 can be found in the description of upsampling module 130 in FIG. 1, the description of upsampled image 240 in FIG. 2, and the description of step 310 in FIG. 3.

At step 410, each new adjustment curve from the full size adjustment image is applied to a corresponding pixel in the original input digital image such that pixel by pixel adjustment or image editing is performed for each pixel in the input image. At step 412, after the pixel by pixel adjustment or image editing, a new or final adjusted image is created. Additional details concerning steps 410 and 412 can be found in the description of final image processing module 140 in FIG. 1, the description of final image 250 in FIG. 2, and the description of steps 312 and 314 in FIG. 3.

Spatially Localized Image Editing

According to the method and system disclosed herein, an input image can be divide into multiple bins in each dimension, for example, to create a 32×32 tile or grid map. Here, the 32×32 tile or grid map is used throughout as an example to illustrate the spatially localized imagine method and system as disclosed herein. It will be understood that an image can be divided in a grid map of any suitable size. For each image tile in a tile map, a histogram of the local image area is computed, along with local image statistics including mean, medium and cumulative histogram. Next, for each image tile, a type of adjustment is determined and applied to the area. The type of adjustment can include, for example, exposure, brightness, shadows, highlights, contrast, and blackpoint. The adjustments are done for all tiles in the input image, and then are interpolated across the image, for example, using an edge-preserving interpolation, to get per-pixel image adjustments across an entire input image.

Specifically, an input image is broken down into discrete "tiles", usually 32×32 tiles across the image size. For each of these image tiles, the histogram of the local image area is computed. Additionally, local image statistics such as mean, median, and cumulative histogram are computed. This gives us an approximation of how well "exposed" each area of the image is. From there, the type of adjustment that can be applied to each specific region is computed. For example, a photo editing application can provide a slider control for adjusting the "light" of a selected image. The "light" adjustment can globally adjust multiple characteristics of the image, such as exposure, brightness, shadows, highlights, contrast, and blackpoint simultaneously, based upon the global statistics of the image; see, for example, U.S. Pat. No. 9,323,996, which is hereby incorporated by reference in its entirety. Although the previously disclosed principals still apply, methods and systems disclosed herein can calculate adjustments that can be applied individually to each of the 32×32 smaller image tiles, thus allowing local adjustments of different areas of an image instead of global adjustment of the entire image as a whole. This type of spatially localized adjustment could also be extended to any other "automatic" adjustment, such as automatic curves, levels, etc.

Once the smaller 32×32 grid of adjustments are obtained, a way is needed to figure out how to adjust the full-size image, based upon those local adjustments. Here, the 32×32 array of adjustments is treated as a tiny image. The image is then upsampled to the full-size of the original image, using a typical image upscaling such as bilinear or cubic interpolation, but that technique has drawbacks. Consider an area of the image that transitions from dark (i.e., underexposed) to bright (i.e., overexposed) at a sharp edge, say a person standing in front of a window or backlit by the sky. If the image is simply interpolated across that dark-to-light edge, a halo would appear, because the under-exposed person would first get too dark (e.g., as the window exposure adjustment bleeds into the face) and then get too light as the correct adjustment of the face comes into play. An example of upscaling a small image is shown below.

To avoid these "halo" artifacts, the original image is as a "guide" to upsample the small adjustment thumbnail to the full size of the image. Common techniques for this type of up sampling are the Joint Bilateral Upsample filter, or the Guided Filter. Either of these techniques can be implemented with an edge preservation.

Once the full-sized adjustment image is obtained, it could be used as a look-up to get a per-pixel image adjustment. For instance, if the adjustment image is an exposure adjustment, both the original image and the adjustment were passed into the our filter. For each pixel in the original, the same pixel of the adjustment image would be examined to determine how to adjust the exposure for that given pixel.

Graphical User Interfaces and Image Editing Control

This disclosure further includes various Graphical User Interfaces (GUIs) for implementing various features, processes or workflows. For example, the GUIs can be implemented through I/O module 104. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

In some embodiments, the GUIs include multiple image editing controls. For example, each image editing control can be used to adjust the values for one or more image parameters. In some embodiments, a parameter as disclosed herein includes image characteristics such as exposure, brightness, shadows, highlights, contrast, blackpoint and combinations thereof. In some embodiments, a parameter as disclosed herein includes constants or variables in an adjustment curve that helps to define the relationships between image characteristics such as exposure, brightness, shadows, highlights, contrast, and blackpoint.

In some embodiments, one or more menu items can be employed as image editing controls. For example, the menu items can be part of an image adjustment menu of the GUIs. Each menu item can be used to set the values of one or more image parameters. For example, a menu item can be a slider bar. A user can change the position of the slider bar to define a desirable value for one or more parameters in an adjustment curve. For example, a user can enter a desired brightness level for a particular bin and intermediate image processing module 120 can deteiwine an adjustment curve based on the desired brightness level. In some embodiments, a menu item (i.e., an image editing control) can adjust the values of two different parameters, three parameters, four parameters, five parameters, or six or more parameters. For example, setting the medium exposure level may also change the values for brightness level, contrast level, shadow level and etc.

Example System Architecture

Figure 5:
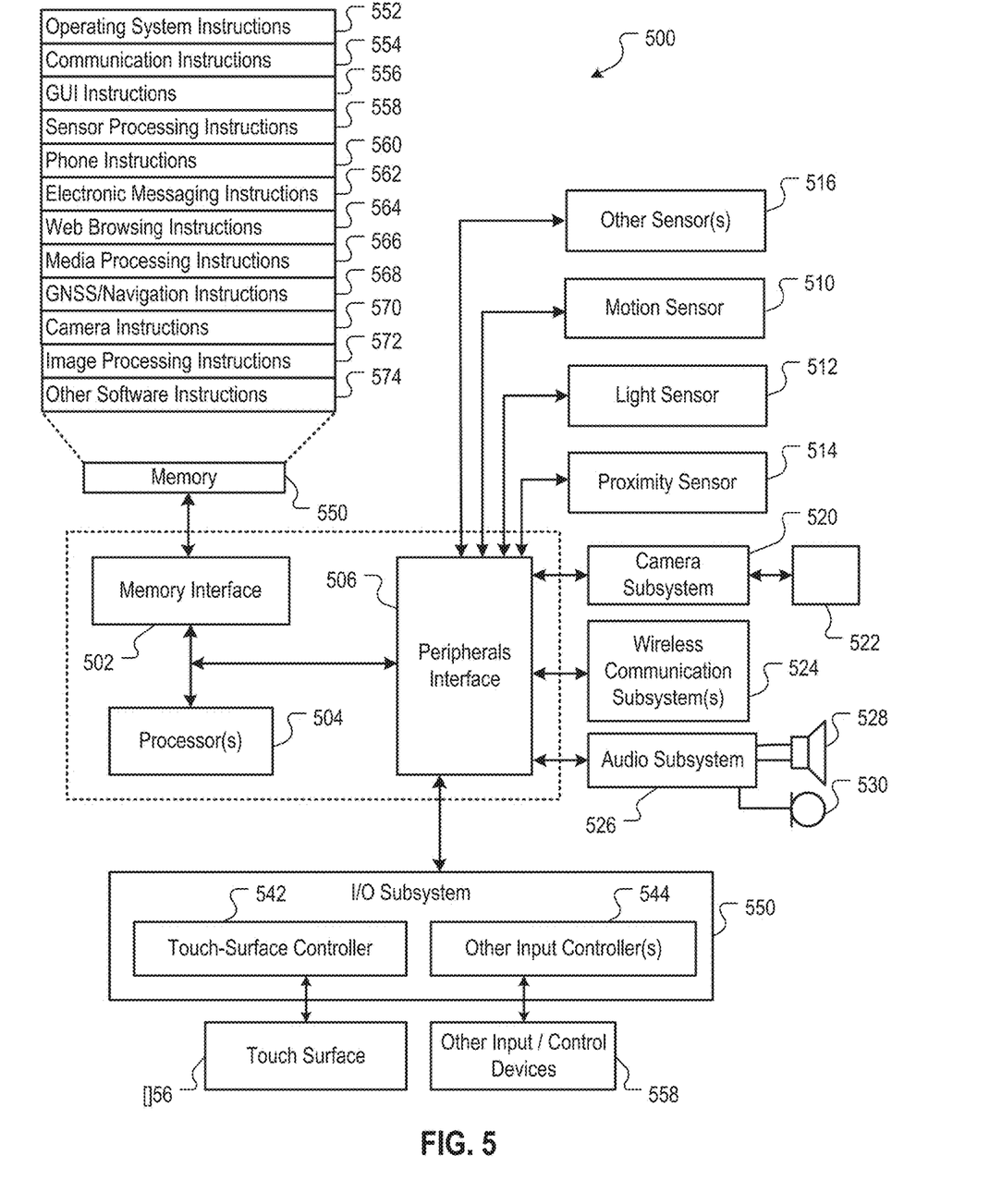
FIG. 5 is a block diagram of an example system architecture implementing the features and processes of FIGS. 1-4.

FIG. 5 is a block diagram of an example computing device 500 that can implement the features and processes of FIGS. 1-4. The computing device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the computing device 500 can be coupled by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a global navigation satellite system (GNSS) (e.g., GPS receiver), a temperature sensor, a biometric sensor, magnetometer or other sensing device, to facilitate related functionalities.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computing device 500 is intended to operate. For example, the computing device 500 can include communication subsystems 524 designed to operate over a GSM network, a GPR.S network, an EDGE network, a Wi-Fi or WiMax network, and a Bluetooth™ network. In particular, the wireless communication subsystems 524 can include hosting protocols such that the device 100 can be configured as a base station for other wireless devices.

An audio subsystem 526 can be coupled to a speaker 528 and a microphone 530 to facilitate voice-enabled functions, such as speaker recognition, voice replication, digital recording, and telephony functions. The audio subsystem 526 can be configured to facilitate processing voice commands, voice printing and voice authentication, for example.

The I/O subsystem 540 can include a touch-surface controller 542 and/or other input controller(s) 544. The touch-surface controller 542 can be coupled to a touch surface 546. The touch surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the touch surface 546; and a pressing of the button for a second duration that is longer than the first duration can turn power to the computing device 500 on or off. Pressing the button for a third duration can activate a voice control, or voice command, module that enables the user to speak commands into the microphone 530 to cause the device to execute the spoken command. The user can customize a functionality of one or more of the buttons. The touch surface 546 can, for example, also be used to implement virtual or soft buttons and/or a keyboard.

In some implementations, the computing device 500 can present recorded audio and/or video files, such as MP3, AAC, and MPEG files. In some implementations, the computing device 500 can include the functionality of an MP3 player, such as an iPod™. The computing device 500 can, therefore, include a 36-pin connector that is compatible with the iPod. Other input/output and control devices can also be used.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks.

The operating system 552 can include instructions for handling basic system services and for performing hardware dependent tasks. In some implementations, the operating system 552 can be a kernel (e.g., UNIX kernel). In some implementations, the operating system 552 can include instructions for performing voice authentication. For example, operating system 552 can implement the image processing features as described with reference to FIGS. 1-4.

The memory 550 can also store communication instructions 554 to facilitate communicating with one or more additional devices, one or more computers and/or one or more servers. The memory 550 can include Graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions.

The memory 550 can store image processing software instructions 572 to facilitate other processes and functions, such as the image processing processes and functions as described with reference to FIGS. 1-4.

The memory 550 can also store other software instructions 574, such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the computing device 500 can be implemented in hardware and/or in software, including in one or more signal processing and/or application specific integrated circuits.

What is claimed is:

1. A method comprising:
   dividing an input image into multiple tiles;
   determining image characteristics of pixels within each tile;
   generating an adjustment image based on the image characteristics of pixels within each tile, wherein the adjustment image is a downsampled version of the input image, and wherein each pixel in the adjustment image is generated from a corresponding tile in the input image using one or more adjustment curves;
   upsampling the adjustment image to create an upsampled image having a same size as the input image;
   determining a pixel-specific adjustment curve for each pixel in the upsampled image; and
   applying, for each pixel in the upsampled image, a corresponding pixel-specific adjustment curve to generate a final image.

2. The method as recited in claim 1, wherein generating the adjustment image comprises creating a plurality of first adjustment images, each first adjustment image being based on a single image characteristic of pixels within each tile, the single image characteristics being selected from the group consisting of: exposure, brightness, shadows, highlights, contrast, and blackpoint.

3. The method as recited in claim 1, wherein generating the adjustment image comprises determining an adjustment curve for each tile in the multiple tiles,
   wherein each adjustment curve defines a relationship of image editing controls that are applied to pixels within the tile,
   wherein the relationship is derived from the image characteristics of pixels within the multiple tiles, and
   wherein the adjustment image comprises a plurality of pixels, each pixel corresponding to an individual adjustment curve for a tile in the multiple tiles.

4. The method as recited in claim 3, wherein each adjustment curve defines at least two relationships of image editing controls that are selected from the group consisting of: exposure controls, brightness controls, shadows controls, highlights controls, contrast controls, and blackpoint controls.

5. The method as recited in claim 3, wherein each adjustment curve is independently selected from a group consisting of: a polynomial function, a linear function, a gamma function, an exponential function, a linear equation, and a sigmoid function.

6. The method as recited in claim 1, wherein generating the adjustment image comprises determining an adjustment curve for each tile in the multiple tiles, wherein at least one adjustment curve is a second order polynomial based tone curve having an input data value and an output result that correspond to pixel values of one or more image attributes selected from a group consisting of: exposure, brightness, shadows, highlights, contrast, and blackpoint.

7. The method as recited in claim 6, wherein the second order polynomial based tone curve is represented by $y=ax^2+(1-a)x$, where x represents the input data value, y represents the output result, and a is a value specific to all pixels in each tile of the multiple tiles.

8. The method as recited in claim 7, wherein y corresponds to a medium brightness level of pixels in one of the multiple tiles.

9. The method as recited in claim 1, wherein upsampling the adjustment image comprises applying an edge preserving upsampling algorithm to the adjustment image, wherein each pixel in the upsampled image corresponds to a new adjustment curve.

10. The method as recited in claim 1, wherein the image characteristics of the pixels within each tile comprise one or more characteristics selected from a group consisting of: a color histogram, a grey histogram, a cumulative histogram, statistics, and a user-inputted characteristic.

11. A non-transitory computer readable medium storing an image-editing application executable by at least one processor, the image-editing application comprising sets of instructions that, when executed by the at least one processor, cause:
    dividing an input image into multiple tiles;
    determining image characteristics of pixels within each tile;

generating an adjustment image based on the image characteristics of pixels within each tile, wherein the adjustment image is a downsampled version of the input image, and wherein each pixel in the adjustment image is generated from a corresponding tile in the input image using one or more adjustment curves;

upsampling the adjustment image to create an upsampled image having a same size as the input image;

determining a pixel-specific adjustment curve for each pixel in the upsampled image; and applying, for each pixel in the upsampled image, a corresponding pixel-specific adjustment curve to generate a final image.

12. The non-transitory computer readable medium as recited in claim 11, wherein the set of instructions that causes generating the adjustment image further causes determining an adjustment curve for each tile in the multiple tiles, wherein each adjustment curve defines a relationship of image editing controls that are applied to pixels within the tile, wherein the relationship is derived from the image characteristics of pixels within the multiple tiles, and wherein the adjustment image comprises a plurality of pixels, each pixel corresponding to an individual adjustment curve for a tile in the multiple tiles.

13. The non-transitory computer readable medium as recited in claim 12, wherein each adjustment curve defines at least two relationships of image editing controls that are selected from the group consisting of: exposure controls, brightness controls, shadows controls, highlights controls, contrast controls, and blackpoint controls.

14. The non-transitory computer readable medium as recited in claim 11, wherein the set of instructions that causes generating the adjustment image comprises creating a plurality of first adjustment images, each first adjustment image being based on a single image characteristic of pixels within each tile, the single image characteristics being selected from the group consisting of: exposure, brightness, shadows, highlights, contrast, and blackpoint.

15. The non-transitory computer readable medium as recited in claim 11, wherein the set of instructions that causes generating the adjustment image further causes determining an adjustment curve for each tile in the multiple tiles, wherein at least one adjustment curve is a second order polynomial based tone curve having an input data value and an output result that correspond to pixel values of one or more image attributes selected from a group consisting of: exposure, brightness, shadows, highlights, contrast, and blackpoint.

16. The non-transitory computer readable medium as recited in claim 15, wherein the second order polynomial based tone curve is represented by $y=ax^2+(1-a)x$, where x represents the input data value, y represents the output result, and a is a value specific to all pixels in each tile of the multiple tiles.

17. The non-transitory computer readable medium as recited in claim 16, wherein y corresponds to a medium brightness level of pixels in one of the multiple tiles.

18. The non-transitory computer readable medium as recited in claim 11, wherein the set of instructions that causes upsampling the adjustment image further causes applying an edge preserving upsampling algorithm to the adjustment image, wherein each pixel in the upsampled image corresponds to a new adjustment curve.

19. The non-transitory computer readable medium as recited in claim 11, wherein the image characteristics of the pixels within each tile comprise one or more characteristics selected from a group consisting of: a color histogram, a grey histogram, a cumulative histogram, statistics, and a user-inputted characteristic.

20. An apparatus comprising:

at least one processor; and a non-transitory computer readable medium storing an image-editing application, the image-editing application comprising sets of instructions that, when executed by the at least one processor, cause:

dividing an input image into multiple tiles;

determining image characteristics of pixels within each tile;

generating an adjustment image based on the image characteristics of pixels within each tile, wherein the adjustment image is a downsampled version of the input image, and wherein each pixel in the adjustment image is generated from a corresponding tile in the input image using one or more adjustment curves;

upsampling the adjustment image to create an upsampled image having a same size as the input image;

determining a pixel-specific adjustment curve for each pixel in the upsampled image; and applying, for each pixel in the upsampled image, a corresponding pixel-specific adjustment curve to generate a final image.

* * * * *